US012762800B2

(12) United States Patent
Lee

(10) Patent No.: US 12,762,800 B2
(45) Date of Patent: *Oct. 13, 2026

(54) IMMERSIVE LIVE DIGITAL TWIN OF AN INDOOR AREA

(71) Applicant: Seng Fook Lee, Singapore (SG)

(72) Inventor: Seng Fook Lee, Singapore (SG)

(73) Assignee: POLYTRON.AI PTE. LTD., Singapore (SG)

( * ) Notice: Subject to any disclaimer, the term of this patent is extended or adjusted under 35 U.S.C. 154(b) by 195 days.

This patent is subject to a terminal disclaimer.

(21) Appl. No.: 18/646,820

(22) Filed: Apr. 26, 2024

(65) Prior Publication Data

US 2025/0124663 A1 Apr. 17, 2025

Related U.S. Application Data

(60) Provisional application No. 63/498,525, filed on Apr. 27, 2023.

(51) Int. Cl.
*G06T 19/00* (2011.01)

(52) U.S. Cl.
CPC .................................. *G06T 19/003* (2013.01)

(58) Field of Classification Search
CPC .......................... G06T 19/003; G06T 2210/04
See application file for complete search history.

(56) References Cited

U.S. PATENT DOCUMENTS

2021/0074062 A1* 3/2021 Madonna ................ G06F 3/011
2023/0236493 A1* 7/2023 Muir ...................... G03B 37/04
396/332

* cited by examiner

*Primary Examiner* — Chong Wu
(74) *Attorney, Agent, or Firm* — HORIZON IP PTE. LTD.

(57) ABSTRACT

Immersive live digital twins of an area are disclosed. The immersive live digital twin is produced by scanning the indoor area to obtain a static 3D model of the indoor area. Live feeds of the indoor area are stitched to the static 3D model to produce a live digital twin of the area which a user can navigate through different parts thereof.

20 Claims, 19 Drawing Sheets

100

102

102

103

310

307

305

IMMERSIVE LIVE DIGITAL TWIN OF AN INDOOR AREA

CROSS-REFERENCE TO RELATED APPLICATION

This application claims the benefit of provisional application having Application No. 63/498,525, which was filed on Apr. 27, 2023, and which is incorporated herein by reference in its entity for all purposes.

FIELD OF THE INVENTION

The present disclosure generally relates to generating a 3D model of an area. In particular, the disclosure relates to the generation of a live 3D Tour of an area which enables a user to immersively experience the area virtually as if the user were physically there in real-time. More particularly, the area is an indoor area.

BACKGROUND 3D modeling of an area generally includes scanning the area to create a point cloud, transforming the point cloud to a mesh model, texturing the mesh model, and rendering the textured mesh model to generate the 3D model. Conventionally 3D models are static models. For example, the 3D models are based on what was originally scanned. Although the 3D model can be manipulated, it nevertheless remains based on what was originally scanned. In other words, the 3D models do not depict the modeled area in real-time.

From the foregoing disclosure, there is a desire to provide real-time 3D models of an area.

SUMMARY

Real-time live 3D models are disclosed. In one embodiment, a system for displaying an immersive live digital twin of an indoor area is disclosed. The system includes a static digital twin module. The static digital twin module includes a static digital twin model of the indoor area. An input module is configured to receive live feeds of the indoor area from a plurality of cameras located in the indoor area. An integration module is configured to stitch the live feeds of the indoor area to the static digital twin model to create the immersive live digital twin. The system also includes a display module for displaying the immersive live digital twin to provide a user with the perception that the user is immersed with the immersive live digital twin. The user may navigate to different parts of the immersive live digital twin using a navigation module of the system.

In another embodiment, a method for generating an immersive live digital twin of an indoor area is disclosed. The method includes scanning the indoor area to create a static digital twin model of the indoor area the indoor area. Live feeds of the indoor are obtained from a plurality of cameras located in the indoor area. The live feeds are stitched to the static digital twin model to create the immersive live digital twin of the indoor area. The immersive live digital twin is displayed. A user is provided with the perception of being immersed within immersive live digital twin. The user is able to navigate through the immersive live digital to different parts of the indoor area.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of various embodiments. In the following description, various embodiments of the present disclosure are described with reference to the following, in which.

DETAILED DESCRIPTION

Figure 1A:
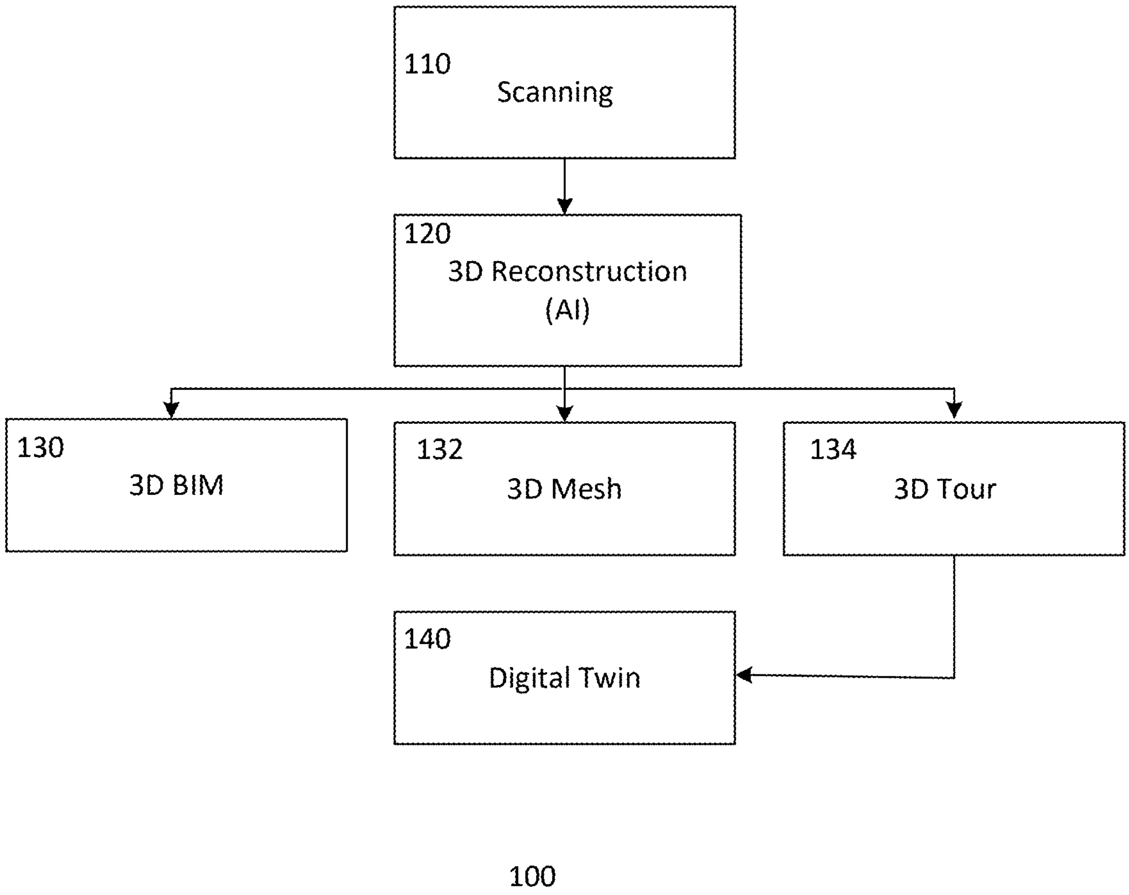
FIG. 1*a* shows a simplified process flow for generating a 3D digital replica or twin of a location or area.

FIG. 1*a* shows a simplified process flow 100 for generating a 3D digital replica of a location or area. The location, in one embodiment, is an indoor area such as an office or building. The building may have a single floor or multiple floors. Other types of indoor areas may also be useful. In other embodiments, the location may be an outdoor area. The digital replica enables a user to tour or navigate throughout the digital replica. In one embodiment, video feeds of the area are stitched to the digital replica, producing an immersive virtual tour. A user can go to any position within the digital replica and view that location as if the user were standing there. The user may turn and view the area from the position. This gives the user an immersive experience from a specific position of the digital replica. In other words, the user is at a position within the location and viewing the location from that position. For example, the user may navigate to any position within the digital replica and see everything surrounding the user animated.

In another embodiment, the video feeds are live video feeds which are stitched to the digital replica. This produces a real-time immersive tour of the location. With real-time video feeds stitched, the user can see exactly what is going on in real-time, as if the user were physically there. For example, the user may navigate to any position within the digital replica and see everything surrounding the user animated and in real-time. This includes people who are at the location and what they are doing in real-time. Of course, when we refer to real-time, there may be delays related to processing (e.g., stitching the video feeds) and data transmission. Other delays may also be included. However, such delays may be considered negligible. For example, the 3D real-time virtual tour of the replica may still be considered real-time or essentially real-time. Real-time may refer to real-time or near real-time, for example, delay due to processing. The digital replica with the live video feeds may be referred to as a live digital twin, giving the experience of being physically there at that moment in time.

A static tour model may be created. The tour model may be created by scanning the indoor area completely. For example, the static tour model is a 3D digital twin of the complete area. The live video feeds are stitched to the static tour model, creating a live 3D digital twin of the area. The live 3D digital twin depicts what is occurring in the area in real-time. The stitching may be continuously performed in the background as the feeds are received.

As shown, the process flow commences at 110 by scanning the indoor location. The scanning, for example, is performed in a central position of the indoor area, such as a room. The scanning is a 360° scan of the indoor location, including above and below, such as the ceiling and the floor. The scanning detects all objects within the indoor location. In one embodiment, the scanning is performed using a LiDar type or 360° camera. The scan produces depth and RGB imagery. Other types of RGB or RGBD cameras may also be used. The scanning, for example, generates a depth map of the scanned space. The scanning may be repeated for other areas of the location, such as other rooms of a floor of a building, other floors of the building, stairwells of the building, elevators of the building, as well as other areas of the building.

After scanning is completed, a 3D reconstruction of the scan data is performed at 120. The reconstruction, for example, utilizes artificial intelligence (AI) to reconstruct the scan data. For example, the reconstruction process includes processing and combining the scanned data to create 3D models of the scan space or spaces. The different scans, for example, generate data for the different spaces and are processed using AI to form an overall reconstruction of the area of interest. The area of interest may be from a single scan or multiple scans. For example, the area of interest may be a room, an office space, a floor of a building, floors of a building or all floors of a building. Other areas of interest may also be useful. The reconstruction generates a 3D BIM model at 130, a 3D mesh model at 132 and a 3D tour model at 134. The various models are different 3D digital representations or replicas of the scanned space or area of interest.

Figure 1B:
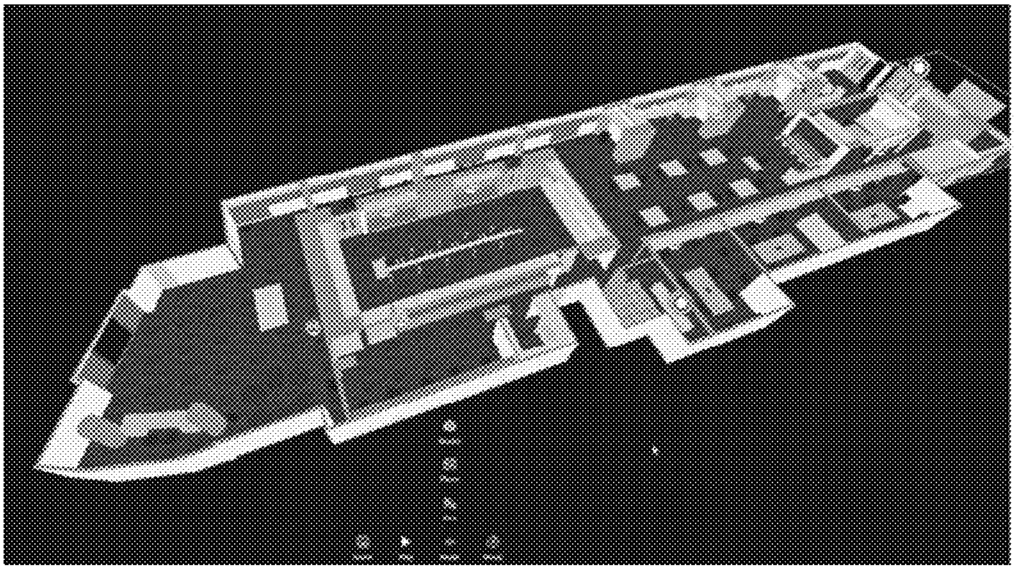
FIG. 1*b* shows an exemplary Building Information Modeling (BIM) model of an area of interest.

In one embodiment, the BIM model is a basic 3D model of the scanned area of interest. FIG. 1*b* shows an exemplary BIM model 102 of an area of interest. As shown, the BIM model includes basic texturing. Basic texturing, for example, shows different aspects or elements of the model. A control panel may be included in the interface which displays the BIM model to navigate the model as well as the system. The control panel, for example, may include various options for a user to switch to different models, and move from one section of the area to another, as well as other options.

Figure 1C:
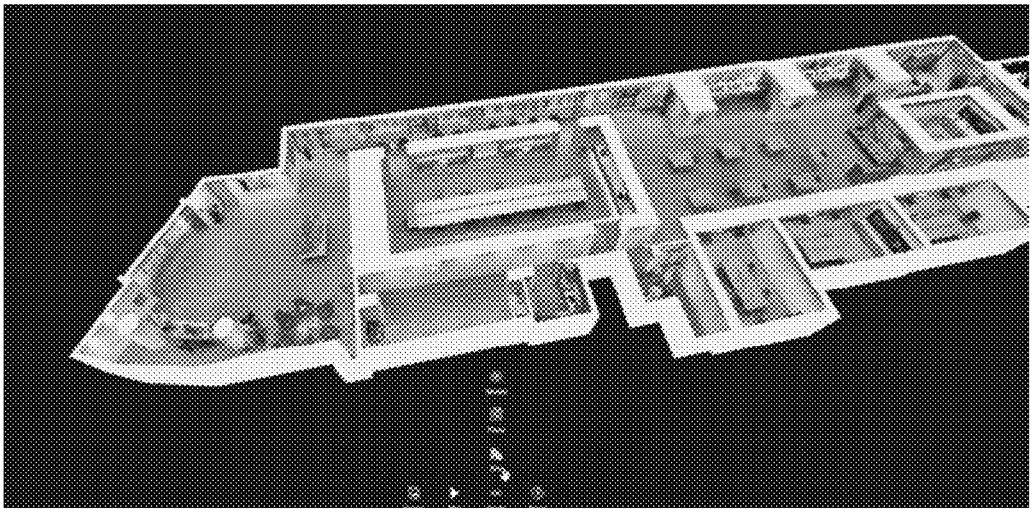
FIG. 1*c* shows an exemplary 3D mesh model.
Figure 1D:
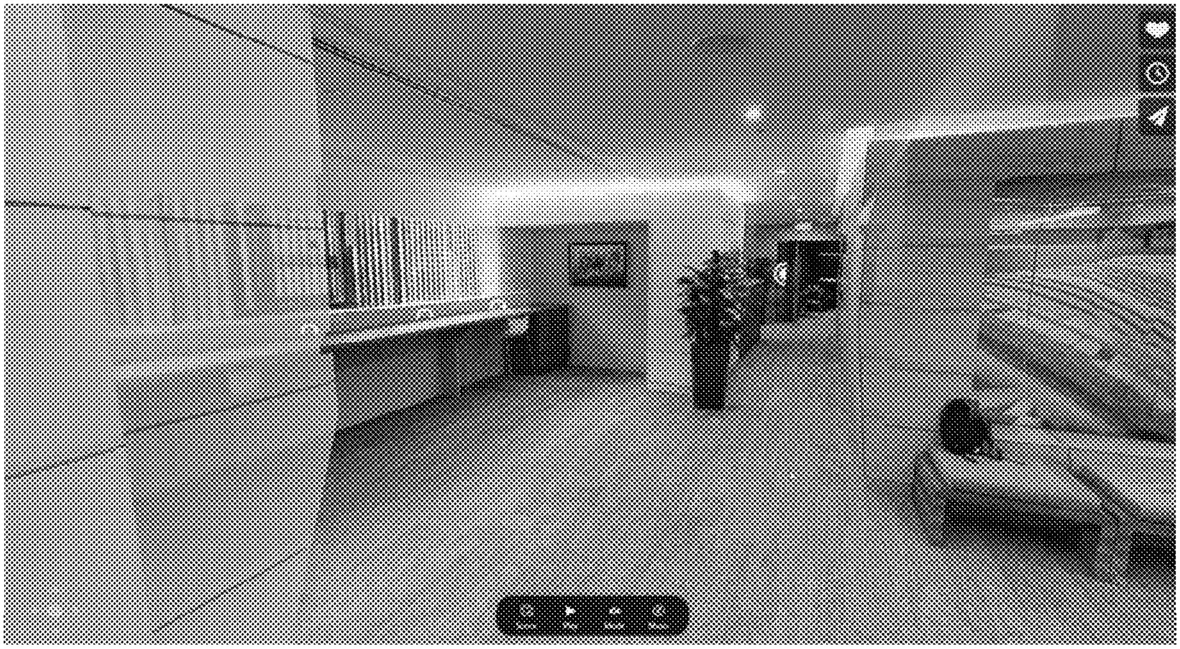
FIG. 1*d* shows a tour model.

FIG. 1*c* shows an exemplary 3D mesh model 103 which has been textured. Compared to the BIM model, the mesh model is more realistic. For example, the texturing for the 3D mesh model is more detailed. FIG. 1*d* shows a tour model 104. In one embodiment, the tour model is a basic tour model. The basic tour model, for example, includes stitched videos of the area of interest, producing a digital twin at 140. The tour model produces an immersive view of the area of interest to the user as if the user were physically there. For example, a user can navigate to be positioned at a specific position of the tour model and visually view the area of interest from that position. In the case of a live tour, live video feeds are stitched, providing a real-time view of the specific position of interest. This creates a live digital twin experience. A non-live 3D tour model may also be provided. The non-live 3D model may include non-live video feeds stitched, creating a static 3D tour model.

In one embodiment, a user may navigate to different parts of the area of interest using any of the models. For example, different models enable the user to navigate to different positions of the model. For example, each model may include a control panel to switch from one model to another as well as to migrate from one position to another. In addition, a user may zoom in or zoom out (e.g., moving closer or farther away). Migrating from one position to another may also be achieved using the pointer or mouse to move and select the desired position.

In one embodiment, the 3D model includes immersive locations dispersed within the indoor area. The immersive locations include cameras that capture videos at the immersive locations. A user may navigate to an immersive location and would view the area as if he/she were standing there. For example, a user may view 360° outwardly from the immersive location. Live video feeds from the immersive camera may be stitched to the static 3D tour model. The immersive 3D model with live video feeds may be referred to as a live immersive digital twin of the area.

Figure 1E:
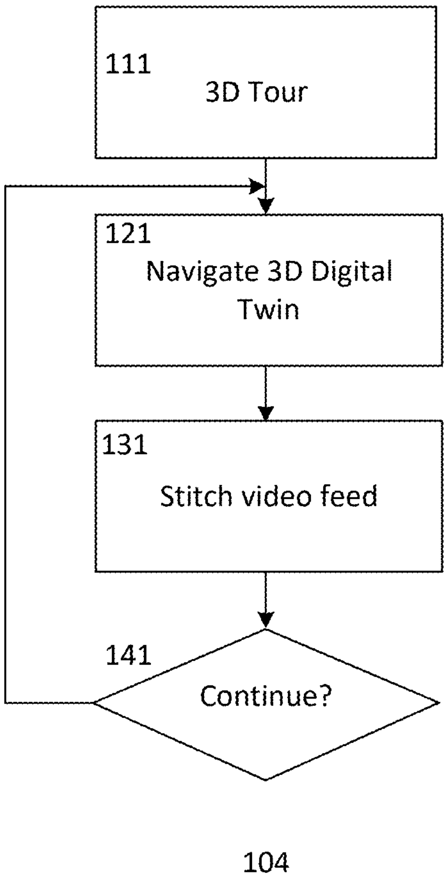
FIG. 1*e* shows a simplified process flow depicting a 3D tour by a user.

FIG. 1*e* shows a simplified process flow 104 depicting a 3D tour by a user. At 111, the 3D tour commences. The user may initiate a 3D tour of the area of interest on the 3D immersive system. The 3D immersive system, for example, may include a 3D immersive software running on a server. The server may be a backend server which a user can access over the internet. The server includes the various models. For example, the static 3D tour model, the BIM model and the mesh model. The server receives continuous live video feeds of the area of interest and stitches them to generate a live 3D tour model. The static 3D tour model is continuously updated by stitching the live video feeds to the model.

As discussed, in the live 3D tour model, live video feeds are stitched to the static 3D tour module. For example, the live 3D tour will show in real-time what is occurring in the selected area. For example, a user taking the live 3D tour may navigate the area. Where the user navigates to, will show what is occurring in real-time at that location. For example, if there are people, it will show the people. The stitching will also be able to provide the perspective, as selected by the user, of what is occurring in the selected area. Stitching, for example, may be performed using artificial intelligence (AI). The selected area will be displayed with the appropriate perspective as the user navigates the area using the live 3D tour.

In one embodiment, reduced processing by the AI can be achieved by selectively stitching the differential between the real-time and non-real-time videos. For example, only what is different from the non-real-time and real-time videos is stitched to the static 3D tour model. In another embodiment, only certain types of differentials are stitched. For example, differentials which are identified as people, animate objects mirrors, and windows are stitched. Other configurations of stitching the live video feeds to the static 3D model may also be useful.

The user may select a live or non-live tour. When a non-live tour is selected, the static 3D tour model is used. The user can navigate the static tour model. When a live tour is selected, the user navigates the live 3D tour model. The user can navigate to the desired position of the area of interest at 121. For example, the user can select a position within a room to view. For non-live, a pre-recorded video feed is stitched to the tour model 131. The user can view the area of interest for the selected position. In the case of a live 3D tour, a live video feed of the area of interest is stitched to the 3D tour model. This produces a live immersive experience for the user from the selected position.

At the selected position, the user may move around and view the surrounding area. For example, the user may navigate closer to an object at the selected position or turn to view a different direction of the surrounding area at the selected position. Video cameras are strategically located in the room to enable capturing the whole room from any position within the room and in any direction. For example, video cameras may be mounted on different parts of the walls of the room and/or on objects, such as lamps. The camera, for example, is a 360° camera. The camera can be equipped with telescopic lenses for effecting zooming in and out. Other configurations of cameras may also be useful. The cameras may be mounted on a swivel or rotating mount. The cameras may be mounted on rotatable mounts and are equipped with telephoto lenses for zooming in and out. In some cases, the cameras may be multi-directional cameras. Other configurations of cameras may also be useful.

Based on the location and direction which the user has selected, the system instructs the appropriate video feeds to stitch. For example, if the user moves towards an object, the camera may zoom in as the user is getting closer. If the user rotates and moves in another direction, the video feed or feeds capturing the view from the other direction are stitched. For example, feeds from more than one camera can be stitched. For example, the system is configured to stitch video feeds from any position and in any direction of the room or area. For example, as the user navigates from one position to another, the video feeds from the appropriate camera or cameras are stitched. The user may also continue to navigate within the room or to another area, such as another room at 141. The 3D tour continues until terminated by the user.

Figure 2A:
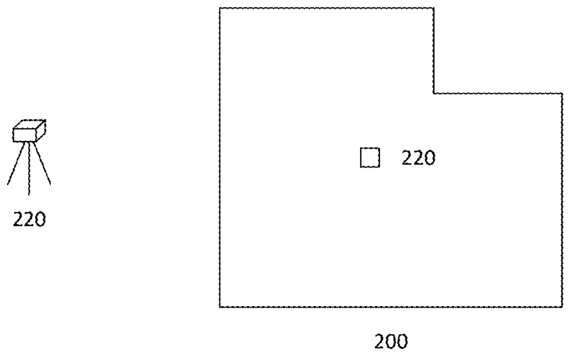
FIG. 2*a*-2*b* show top and perspective views of an area of interest.
Figure 2B:
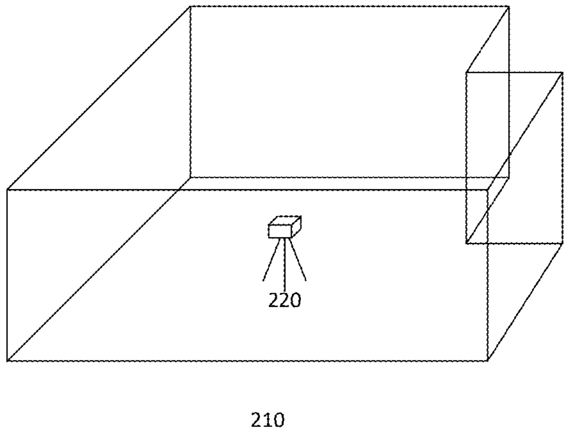

FIG. 2*a*-2*b* show top and perspective views of an area of interest 200, such as a room. A camera 220 may be placed, for example, near or at the center of the area. The camera, for example, performs a 360° scan of the area. The camera, for example, is a LiDar camera which detects the distances of objects captured, such as walls, ceilings, windows, tables, and columns as well as other types of objects. Other types of cameras may also be useful.

Figure 2C:
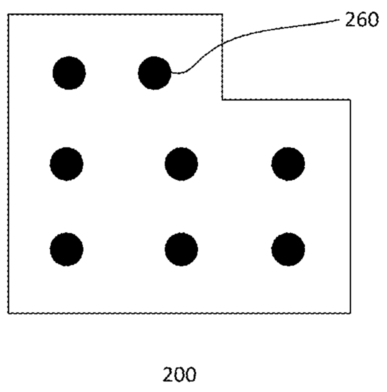
FIG. 2*c*-2*e* illustrates a top view of the indoor area.
Figure 2D:
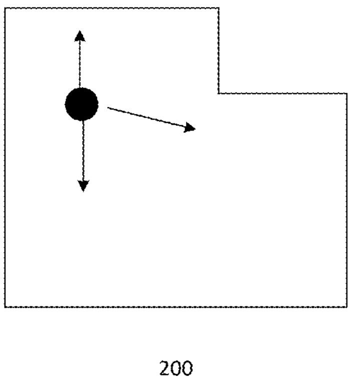
Figure 2E:
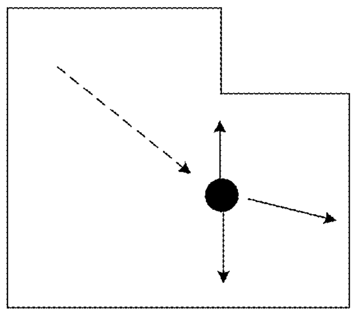

FIG. 2*c* illustrates a top view of the indoor area 200 with immersive locations 260 dispersed therein. For example, the cameras are disposed at immersive locations. The cameras provide pre-recorded or live videos to stitch to the tour model to provide an immersive or live immersive 3D tour. Other configurations of the cameras may also be useful. In one embodiment, the cameras are 360° cameras which generate live 360° videos or feeds, as illustrated by FIGS. 2*d*-2*e*.

FIGS. 3*a*-3*i* show various views of an embodiment of a digital twin system. The system, for example, displays various views on a system user interface (UI). For example, the views may be displayed on a computer display or monitor when the system is initiated. As shown, the views include various views or models of a scanned location 340, such as an office.

Figure 3A:
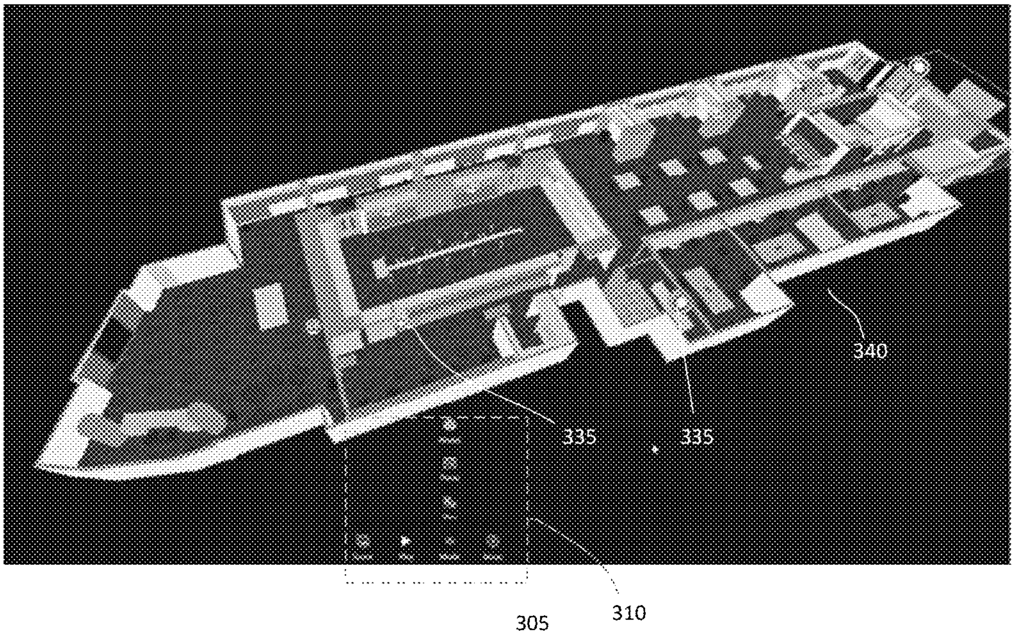
FIGS. 3*a*-3*i* show various views of an embodiment of a digital twin system

Referring to FIG. 3*a*, a BIM model 305 of the office is shown. For example, the BIM model is generated from scanning data of the office. The BIM model may be displayed in a user interface of the digital twin system. As shown, the BIM model includes walls defining the interior space of the office. The office and various rooms or areas, such as work areas, meeting rooms, lobby, and offices. Other types of areas may also be included in the BIM model. The BIM model includes basic texturing. For example, colors and textures of different features of the office are generated. However, the texture is not high quality, resulting in the model.

A user may navigate to different areas or positions within the BIM model. To navigate to different areas or positions, a mouse may be employed. For example, the user may move the pointer using the mouse to the desired position and click to select. The selected area is displayed on the user interface in greater detail. The user may further look at different ports of the selected area using the mouse.

In addition, the BIM model may include action buttons or hot spots 335. A user may select a button using the mouse. For example, the user may navigate the cursor to the desired action button and click to select it. Selecting a button may generate a desired action.

Figure 3B:
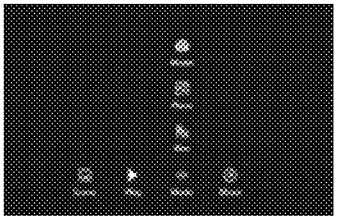

The user interface includes a control panel 310. The control panel includes various control buttons for the user to select. FIG. 3*b* shows a detailed view of the control panel 310. As shown, the control panel includes scene, play, mode and music control buttons. Other control buttons may also be provided. Each control button may include a submenu. For example, clicking on a control button shows a list of options within the control button.

Figure 3C:
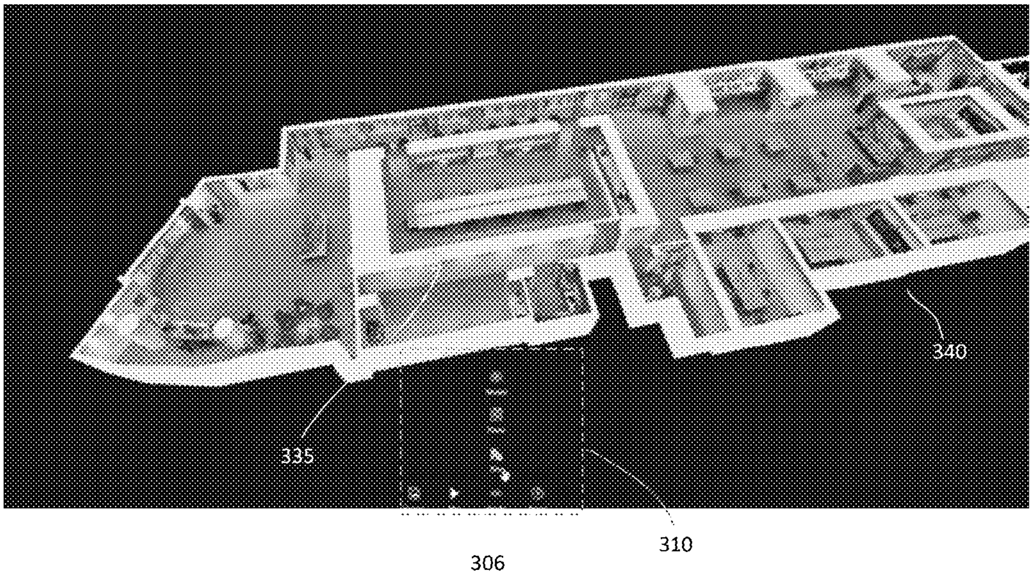

Referring to FIG. 3*c*, a mesh model 306 of the office 340 is shown. The mesh model is based on the scanned data used to generate the BIM model. The mesh model may be displayed on the user interface by selecting the model selection of the control button menu. The mesh model is textured. The texturing is more detailed compared to the BIM model, resulting in a more realistic model. Similar to the BIM model, the user may navigate to different parts of the office, and select action buttons 335 as well utilizing the control panel 310 to provide the desired settings.

Figure 3D:
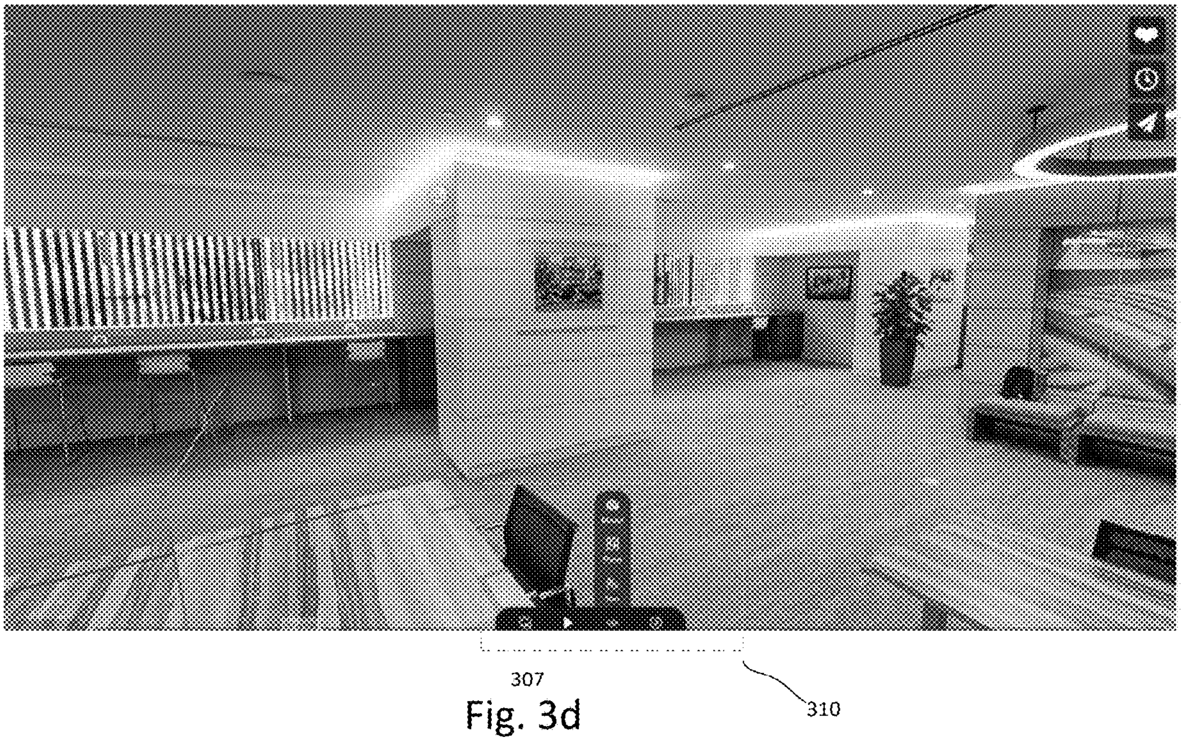
Figure 3E:
Figure 3F:

FIGS. 3*d*-3*f* show different digital twin views 307 of the office. Video feeds are stitched to the model to produce a real digital twin of the office. For example, video feeds are captured are stitched to the model to produce a real-life digital twin of the office as you would see it. In the case of a live digital twin, real-time video feeds are stitched to the model.

Figure 3G:
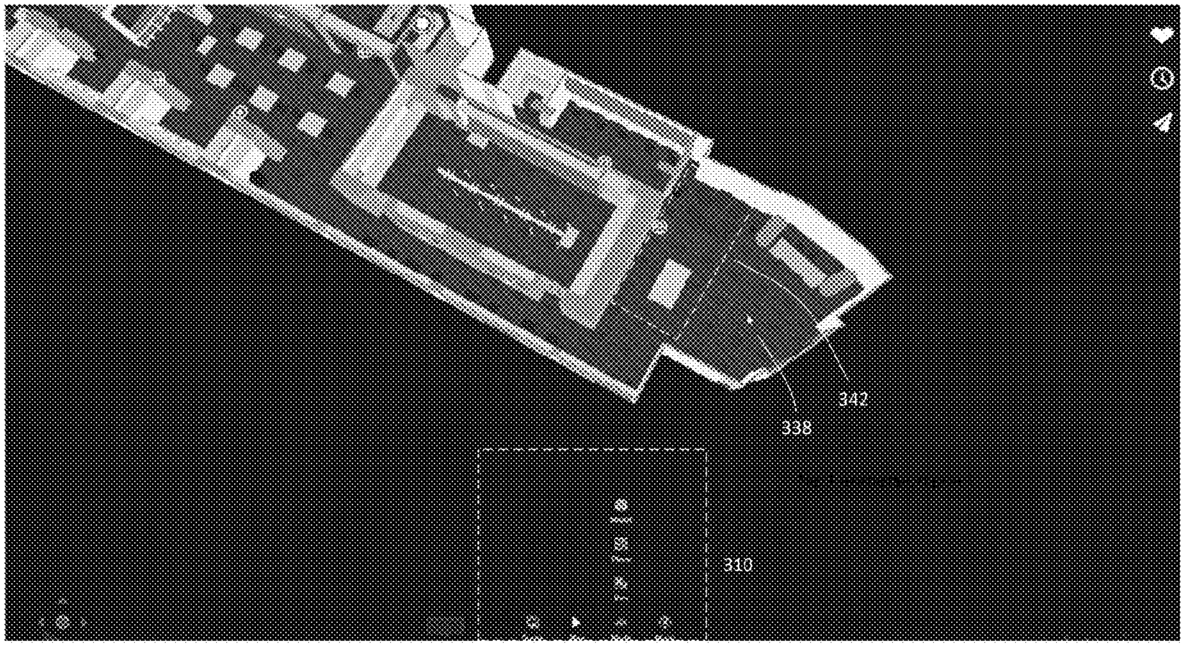
Figure 3H:
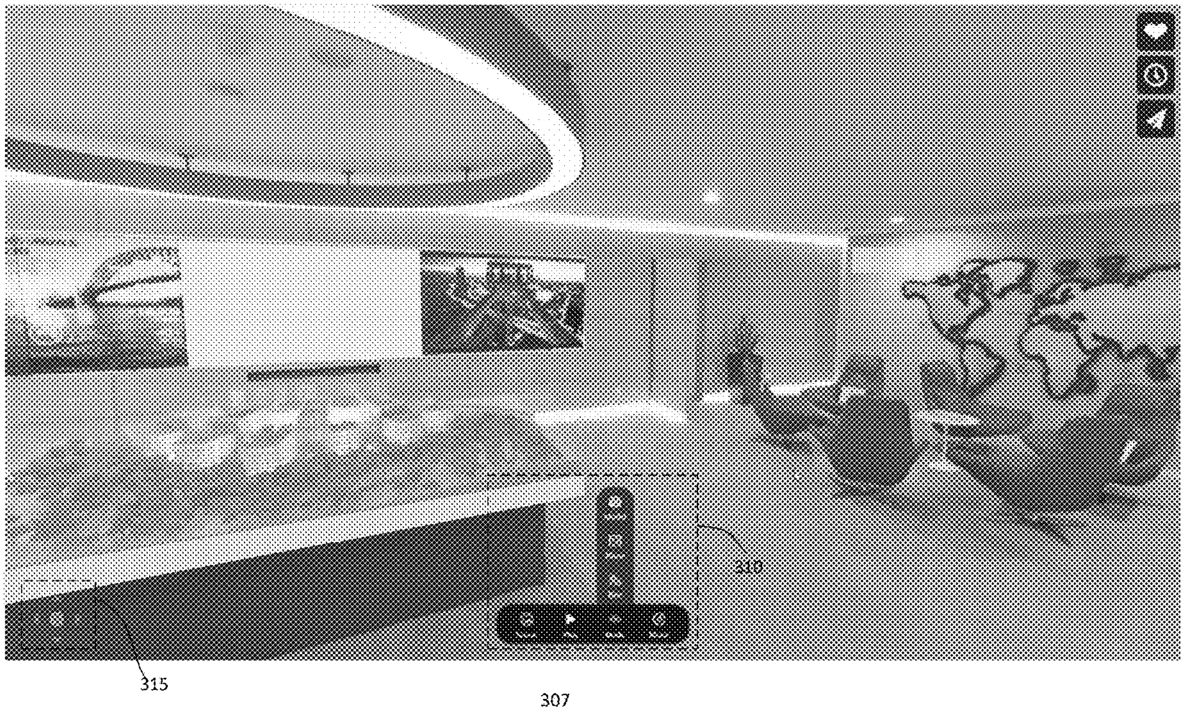

FIG. 3*g*-3*h* illustrates an example of navigating the digital twin system. Referring to FIG. 3*g*, the BIM model is displayed in the BIM mode. A user may navigate to an area 342 of the office using the mouse. For example, the cursor 338 may be navigated to the area of interest in the BIM model and click to select. The selected area is displayed. Other navigation techniques, such as the use of touch screen display, may also be employed.

Figure 3I:
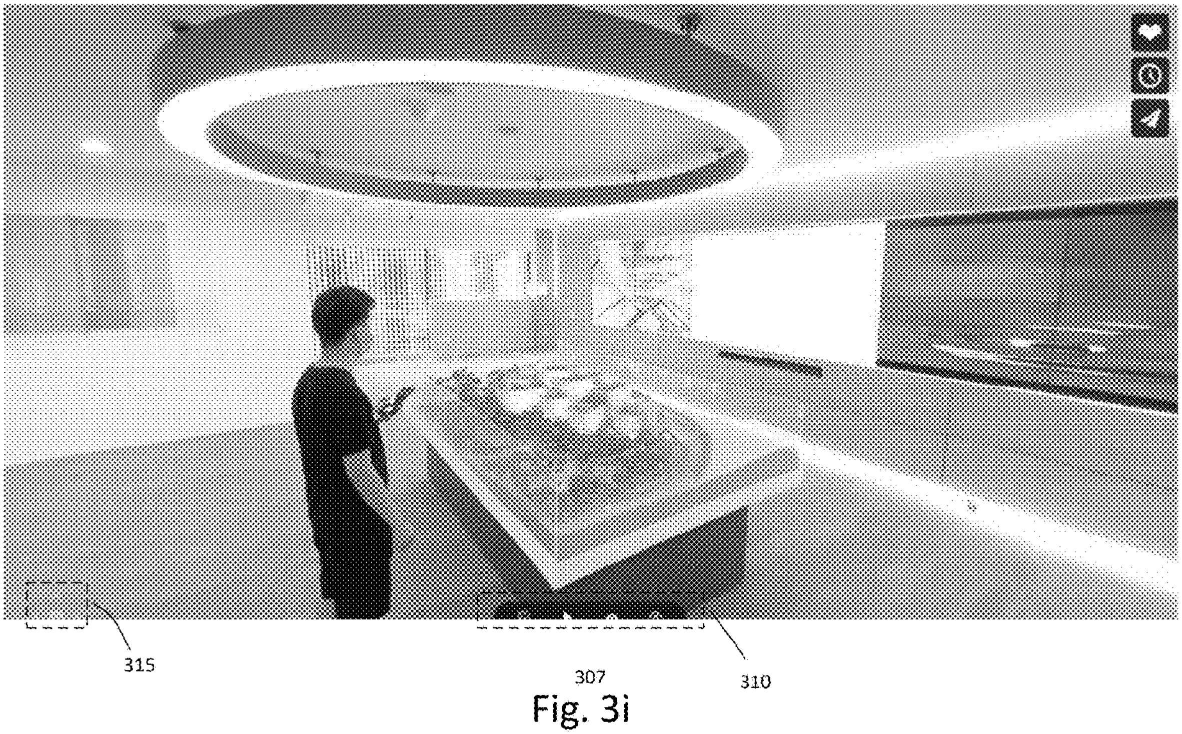

In FIG. 3*h*, the user switches to the live tour mode using the control panel 310. For example, the user selects the plane mode. This causes the live digital twin tour of the selected area to display on the user interface. For example, live video feeds of the selected area are stitched to the model. The user may use the cursor and a navigator 315 to rotate and move around the live digital twin, as depicted in FIG. 3*i*.

The present disclosure may be embodied in other specific forms without departing from the spirit or essential characteristics thereof. The foregoing embodiments, therefore, are to be considered in all respects illustrative rather than limiting the invention described herein. The scope of the invention is thus indicated by the appended claims, rather than by the foregoing description, and all changes that come within the meaning and range of equivalency of the claims are intended to be embraced therein.

The invention claimed is:

1. A system for displaying a 3D digital model of an indoor area comprising:

a model module, the model module includes a BIM model, a textured 3D mesh model, a basic tour model and a live tour model, wherein the BIM model is a 3D model of a scan of the indoor area (scanned indoor 3D model) with basic texturing, the textured 3D mesh model is the scanned indoor 3D model with detailed texturing greater than the basic texturing, and the basic tour model includes feeds stitched to the scanned indoor 3D model to produce a static digital twin model of the indoor area, and the live tour model includes live feeds stitched to the scanned indoor 3D model to produce a live digital twin;

an input module, wherein the input module is configured to receive the live feeds of the indoor area from a plurality of cameras located in the indoor area;

an integration module, wherein the integration module is configured to stitch the live feeds of the indoor area to the scanned indoor 3D model to create the live tour model; and a display module for displaying a user interface, the user interface includes a control module, the control module enables a user to control the system, the control module includes a control panel displayed on the user interface, the control panel includes a model selector, the model selector enables the user to select one of the BIM model, the textured 3D mesh model, the basic tour model or the live tour model in the model module to display (selected model) on the user interface, and a navigation controller, the navigation controller enables the user a to navigate to different parts of the selected model displayed on the user interface.

2. The system of claim 1 wherein the cameras comprise multi-directional cameras.

3. The system of claim 1 wherein the cameras comprise cameras equipped with telephoto lenses for zooming in and out.

4. The system of claim 1 wherein the cameras are strategically located in the indoor area to capture the indoor area from any position and in any direction.

5. The system of claim 1 wherein the integration module is configured to stitch appropriate live feeds from any position and in any direction of the indoor area based on the user's location and direction as the user navigates the indoor area to provide an appropriate perspective of the indoor area to the user.

6. The system of claim 5 wherein the cameras are configured to zoom in and zoom out from any position and in any direction based on the movement of the user to provide appropriate live feeds as the user navigates within the indoor area.

7. The system of claim 1 wherein the live tour model includes live feeds stitched to the static digital twin model to produce the live digital twin.

8. The system of claim 7 wherein the integration module is configured to stitch a differential of the feeds and live feeds to the static digital twin model to produce the live digital twin model.

9. The system of claim 7 wherein the integration module is configured to stitch a differential of appropriate feeds and appropriate live feeds from any position and in any direction of the indoor area based on the user's location and direction as the user navigates the indoor area.

10. The system of claim 9 wherein the cameras are configured to zoom in and zoom out from any position and in any direction based on the movement of the user to provide the differential of the appropriate feeds and the appropriate live feeds as the user navigates within the indoor area.

11. A method for generating 3D models of an indoor area comprising:

scanning the indoor area to create a scanned indoor 3D model of the indoor area;

placing cameras in the indoor area, the cameras are configured to capture live feeds of the indoor area;

generating a BIM model, a textured 3D mesh model, a basic tour model and a live tour model, wherein the BIM model is a 3D model of a scan of the indoor area (scanned indoor 3D model) with basic texturing, the textured 3D mesh model is the scanned indoor 3D model with detailed texturing greater than the basic texturing, and the basic tour model includes live feeds from the cameras in the indoor area which are stitched to the scanned indoor 3D model to produce a static digital twin model of the indoor area, and the live tour model includes live feeds stitched to the scanned indoor 3D model to produce a live digital twin;

selecting one of the BIM model, textured 3D mesh model, basic tour model or live tour model (selected model);

displaying the selected model; and navigating through different parts of the selected model.

12. The method of claim 11 the cameras comprise multi-directional cameras.

13. The method of claim 11 wherein the cameras comprise cameras equipped with telephoto lenses for zooming in and out.

14. The method of claim 11 wherein the cameras are strategically located in the indoor area to capture the indoor area from any position and in any direction.

15. The method of claim 11 wherein the live tour model includes appropriate live feeds stitched from any position and in any direction of the indoor area based on the user's location and direction as the user navigates the indoor area to provide an appropriate perspective of the indoor area to the user.

16. The method of claim 2 wherein the cameras are configured to zoom in and zoom out from any position and in any direction based on the movement of the user to provide appropriate live feeds as the user navigates within the indoor area.

17. The method of claim 11 wherein the live tour model includes live feeds stitched to the static digital twin model to produce the live digital twin.

18. The method of claim 17 wherein a differential of the feeds and live feeds are stitched to the static digital twin model to produce the live digital twin model.

19. The method of claim 17 wherein a differential of appropriate feeds and appropriate live feeds from any position and in any direction of the indoor area based on the user's location and direction as the user navigates the indoor area.

20. The method of claim 19 wherein the cameras are configured to zoom in and zoom out from any position and in any direction based on the movement of the user to provide appropriate live feeds as the user navigates within the indoor area.

* * * * *